United States Patent [19]
Leiber et al.

[11] Patent Number: 5,596,233
[45] Date of Patent: Jan. 21, 1997

[54] LIGHT SWITCHING DEVICE FOR A MOTOR VEHICLE

[75] Inventors: Heinz Leiber, Oberriexingen; Heinz G. Burghoff, Reichenbach; Karlheinz Mangold, Waldstetten; Michael Geber, Bad Urach; Hartmut Fitz, Urbach, all of Germany

[73] Assignee: Mercedes-Benz AG, Germany

[21] Appl. No.: 279,660

[22] Filed: Jul. 25, 1994

[30]  Foreign Application Priority Data

Jul. 23, 1993 [DE]  Germany ............... 43 24 690.7

[51] Int. Cl.⁶ ..................................... B60Q 1/00
[52] U.S. Cl. .................... 307/9.1; 307/10.1; 307/10.8; 340/458; 315/82; 361/730
[58] Field of Search .................... 307/9.1, 10.1, 307/10.6, 10.7, 10.8; 361/600, 626, 628, 629, 730, 833, 834, 835, 826, 828; 439/34, 36; 200/1 R, 17 R, 18, 43.04, 51 R, 51.02, 51.03, 51.05; 315/76, 77, 82, 83, 84; 340/458

[56]  References Cited

U.S. PATENT DOCUMENTS

| | | | |
|---|---|---|---|
| 3,593,264 | 6/1971 | Atkins | 340/458 |
| 5,179,503 | 1/1993 | Fouts et al. | 361/729 |
| 5,231,331 | 7/1993 | Meister | 315/82 |

FOREIGN PATENT DOCUMENTS

| | | |
|---|---|---|
| 0065040 | 11/1982 | European Pat. Off. . |
| 2936187B1 | 3/1981 | Germany . |
| 3802462C2 | 8/1989 | Germany . |
| 1528891 | 10/1978 | United Kingdom . |

OTHER PUBLICATIONS

Search Report and Communication from British Patent Office dated 7 Oct. 1994.

*Primary Examiner*—William M. Shoop, Jr.
*Assistant Examiner*—Peter Ganjoo
*Attorney, Agent, or Firm*—Evenson, McKeown, Edwards & Lenahan P.L.L.C.

[57]  ABSTRACT

A light switching device for a motor vehicle, in which a switching component, capable of more than one switching position, for switching on and off a plurality of lamps of the operating illumination of a motor vehicle, a indicator for illuminating functions and an electrical plug-in connection device are integrated, are insertable in one piece into the dashboard or the instrument panel of the motor vehicle. The device integrates the operating illumination control, the circuit fuses appertaining to the operating illumination and the circuit monitoring, such that the fuses are easily accessible at the level of the actuating handle of the at least one switching component for the illumination control. The device has a patchboard for exchangeable fuses, and at least one integrated semiconductor circuit, monitoring current paths for current flows, for realizing at least one checking and/or warning function.

22 Claims, 4 Drawing Sheets

5,596,233

LIGHT SWITCHING DEVICE FOR A MOTOR VEHICLE

BACKGROUND AND SUMMARY OF THE INVENTION

The present invention relates to a light switching device for a motor vehicle, in which at least one switching component that is capable of more than one switching position for switching on and off a plurality of lamps of the operating illumination of a motor vehicle, indicating means for illumination functions and electrical plug-in connection means are integrated and are insertable in one piece into the dashboard or the instrument panel of the motor vehicle.

At present, light switches, dimmers for setting the brightness of the instrument illumination, devices for checking lamps, fuses for lamps, additional devices such as daytime driving lights, etc. are individually installed in motor vehicles and are individually wired as single modules. A disadvantage of this is the great expenditure on parts, in particular also with regard to the required electrical connections of these parts between one another and sets of cables required for this. Assembly costs are correspondingly high. The resulting weight component and limitations on reliability are also appreciable.

The operating instructions of the Mercedes Benz S class vehicle disclose light switching devices of the same generic type in which a switching component, capable of more than one switching position, for switching on and off a plurality of lamps of the operating illumination of a motor vehicle and indicating means for illumination functions are integrated and which can be inserted in one piece into the dashboard or the instrument panel of the motor vehicle. The electric fuses, which protect corresponding circuits, are accommodated in a main fuse box in the engine compartment and are in connection with the light switching device via corresponding cables.

German Patent Document DE 38 02 462 C2 discloses a steering-column switch for motor vehicles which combines a plurality of light switching functions in one switching component. German Patent Document DE 29 36 187 B1 describes a driving-light and headlamp flasher circuit on a circuit board of a steering-column switch for motor vehicles.

An object of the present invention is to provide a light switching device which significantly reduces the expenditure on parts mentioned at the beginning and the number of required connections between the various parts of the illumination device of a motor vehicle and manages with a minimum of cable sets.

This and other objects are achieved by the present invention that provides a light switching device for a motor vehicle having an operating illumination with a plurality of lamps and exchangeable fusing means, and at least one of a dashboard and an instrument panel. The light switching device comprises at least one switching component, capable of more than one switching position and coupled to the plurality of lamps, for switching on and off the plurality of lamps; indicating means for illumination functions; and electrical plug-in connection means. The switching component, the indicating means and the electrical plug-in connection means are integrated in one piece that is insertable into the dashboard or the instrument panel of the motor vehicle. An integrated semi-conductor circuit that monitors current flows provides at least one of a checking and a warning function for the operating illumination. A patchboard for the fusing means is integrated into the light switching device such that the fusing means are accessible from the interior of the vehicle at the level of the at least one switching component.

The light switching device of the present invention achieves this and other objects by integrating in one piece the operating illumination control, the circuit fuses and circuit monitoring appertaining to the operating illumination, to be precise in such a way that the fuses are very easily accessible. This is achieved by providing the fuses at the level of the actuating handle of the switching component for the illumination control.

The light switching device according to the invention makes it possible for assembly to be simplified considerably. The present invention saves many cables and plug-in connections, considerably increasing reliability. The light switching device can also be installed during vehicle production at preassembly stations, for instance in cockpit assembly. This results in considerable advantages in terms of time and consequently in terms of cost.

Due to the geometrically identical representation of various configurations, any desired exchange of the light switching device between different models or series of vehicle is also possible. Furthermore, the light switching device offers the advantage that all the light operating functions are arranged such that they are concentrated in one area in the cockpit, as a result of which the ergonomics of the operator interface of a vehicle can be optimized in a desired manner.

Two exemplary embodiments of the light switching device according to the invention are described below and are represented in the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
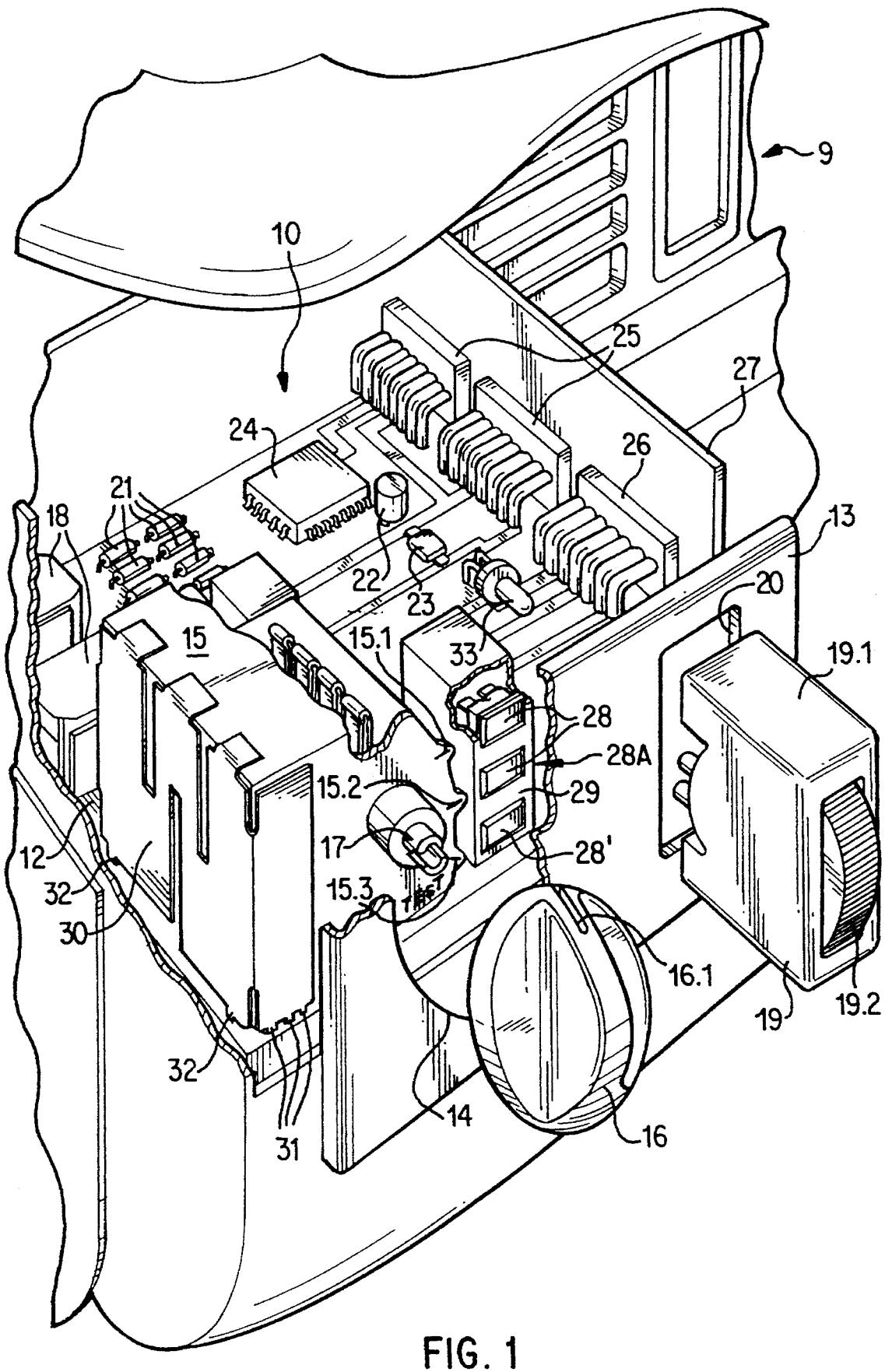
FIG. 1 shows a perspective view of a first exemplary embodiment of the light switching device and its installation in the end region of the dashboard close to the door on the driver's side of a motor vehicle.
Figure 5:
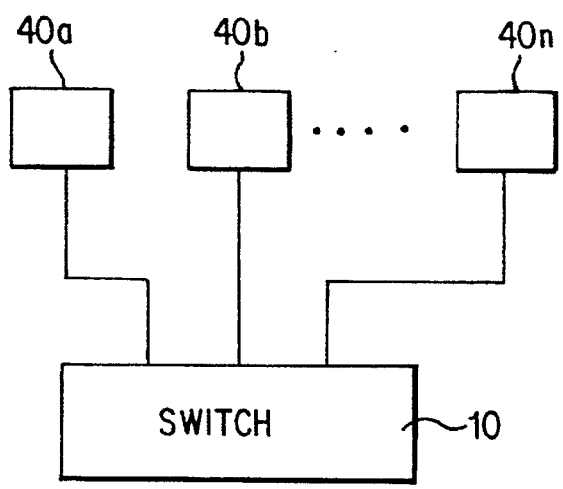
FIG. 5 is a schematic depiction of the light switching device according to the invention coupled to a plurality of lamps which provide vehicle illumination.

According to FIG. 1, the first exemplary embodiment of the light switching device 10 comprises a more or less closed housing 27 which can be inserted into the vehicle's dashboard or instrument panel 9. Inside the closed housing 27 is at least one circuit board 12, on which there is arranged a multifunction light switch 15, also referred to as switching component 15. As shown in FIG. 5, this switching component 15 preferably includes all of the light-switching functions of the operating illumination (lamps 40a–40n) of the motor vehicle apart from, for example, the hazard warning lights. It has a plurality of switching stages or positions which for example may be indicated on the switch housing by position marks 15.1, 15.2, and 15.3 with respect to an element 16.1 of the actuating handle 16 of the switch, this element 16.1 marking the switch position.

On the circuit board 12 there are arranged an integrated semiconductor circuit 24 and furthermore optionally also discrete components 21, 22, 23 (for example resistors and/or diodes and/or inductors and/or capacitors) for sensing at least one lamp current and for providing a checking and warning function for the operating illumination of the vehicle.

The light switching device also has plug-in connectors 25 for connection of the supply lines leading off to the lamps and at least one exchangeable fuse 28 for at least one lamp circuit in a fuse holder 29. In this case, the fuse holder is designed and arranged in such a way that it appears to the user as a patchboard and, as such, is easily accessible after removal of a cover.

Apart from the lamp circuit fuses 28, the fuse holder 29 also contains at least one reserve fuse 28'. It is preferably accessible in the same way as the other fuses 28. Nevertheless, it can also be inserted into, for example, a drawer-like withdrawable frame and can be relocated from there onto a fuse location.

The fuses 28, 28' are arranged in such a way that they are easily accessible from the vehicle interior at switch level. In addition, the arrangement of the fuses is such that their association with the light switch and also with possible operating positions of the light switch for supplying different lamp circuits is evident.

For this purpose, the assignment of fuses to switching positions may be clearly shown by the already mentioned switching position marks 15.1, 15.2, etc. on the housing of the switching component 15. For this purpose, in certain embodiments the actuating handle 16 (hereinafter referred to as "knob 16" without restricting generality) does not have to be removed for exchanging the fuses, so that in conjunction with such marks a clear identification of the fuse assigned to the respectively switched-on circuit is always permitted.

In certain embodiments, at least one position marking 15.3 of the switch is assigned to a test position of the switching component 15. In this test position the knob 16 points, for example, to the one reserve fuse 28' and the light switching device 10 allows a manual testing of all the illumination circuits administered by it.

According to a further development of the invention, the fuse holder 29 is either (as illustrated in the figures) an individual part on the circuit board 12 or an individual part which interconnects a plurality of circuit boards, or is at least partially integrated in one piece with the housing 27 by means of the shape of the housing that portion of fuse which receives plug-in contact elements.

In certain embodiments, the fuse holder 29 and the switching component 15 form an integrated component in one piece. In addition, there may also be provided as an alternative to conventional melting fuses solid-state fuses, which automatically become conductive again once there is no longer an overload.

Furthermore, on the circuit board certain embodiments provide at least one relay 18 for supplying the operating current to lamps, for instance for flow and high-beam headlights or daytime driving lights, etc. In this case, such relays 18 may preferably be unencapsulated, the housing 27 assuming the protective function of individual conventional encapsulations.

On the interior wall 13, the housing 27 has clearances or openings 14 and 20. These openings serve, for example, for receiving the shaft 17 of the switching component 15 or a part of the knob 16 and, for example, an analogue setting element 19, for example for the loading-dependent regulation of the light range, the dimming of the instrument and/or interior illumination, etc., and furthermore for receiving indicator and/or warning lamps or serve, for example, as their light-exit windows in cases where such lamps 33 are arranged directly on the circuit board 12.

Within the scope of the invention, certain embodiments obviate the need for special light-exit windows by, for example, the light from warning lamps 33 being able to exit through partially light-conducting segments or parts (not represented here in the figures) of the knob 16 or of the analogue setting element 19 or of the latter's housing 19.1 and/or actuating element 19.2 into the vehicle interior, it being possible by the use of special light guiding means for corresponding indicator or warning lamps 33 to be arranged at any desired location on the circuit board 12.

The lamp-checking function realized by the circuitry in the light switching device 10 or on the circuit board 12 monitors all the lamps of the operating illumination of the vehicle, namely parking lights, low and high-beam headlights, rear lights, fog lights, reversing lights, rear fog lights, brake lights, license plate lights, side markers and direction indicator lights. Special monitoring means for the hazard warning system may likewise be included.

To realize a lamp-checking function, it is provided in a further embodiment of the invention for the fuses themselves and/or conductor tracks or, for example, metal parts 30, for instance bending punched parts, to be used as measuring shunts. In this case, for example an inadmissibly increasing transfer resistance at the contact studs of a fuse with inadmissible heating can then like likewise be included in monitoring and thus, for example, a fuse holder 29, as an element formed in one piece onto or into a thermoplastic housing 27, can be protected against heat damage in the region of the contact elements for this fuse.

In the figures another embodiment is illustrated, in which, for example, a metallic covering sheet of the switching component 15 close to a side wall of the housing 27 of the light switching device 10, dissipating heat outwards into the space behind the dashboard or the instrument panel 9, is designed as a measuring shunt. In the embodiment, the metallic covering sheet has a separate load-current path 31 and measuring-voltage terminals 32, and thus at the same time performs fastening, dust-protecting, current-conducting and measuring functions.

In certain embodiments control electronics are integrated into the light switching device 10, such as for example for daytime driving lights in Canada, daytime driving lights in Norway/Sweden, for checking the illumination of trailers, time-function relays, light dimmers and headlamp height adjustment. In addition the light switching device 10 also includes means for connection of the same to communicate with other devices in the vehicle, preferably at least one special communication plug-in connector 26.

Figure 2:
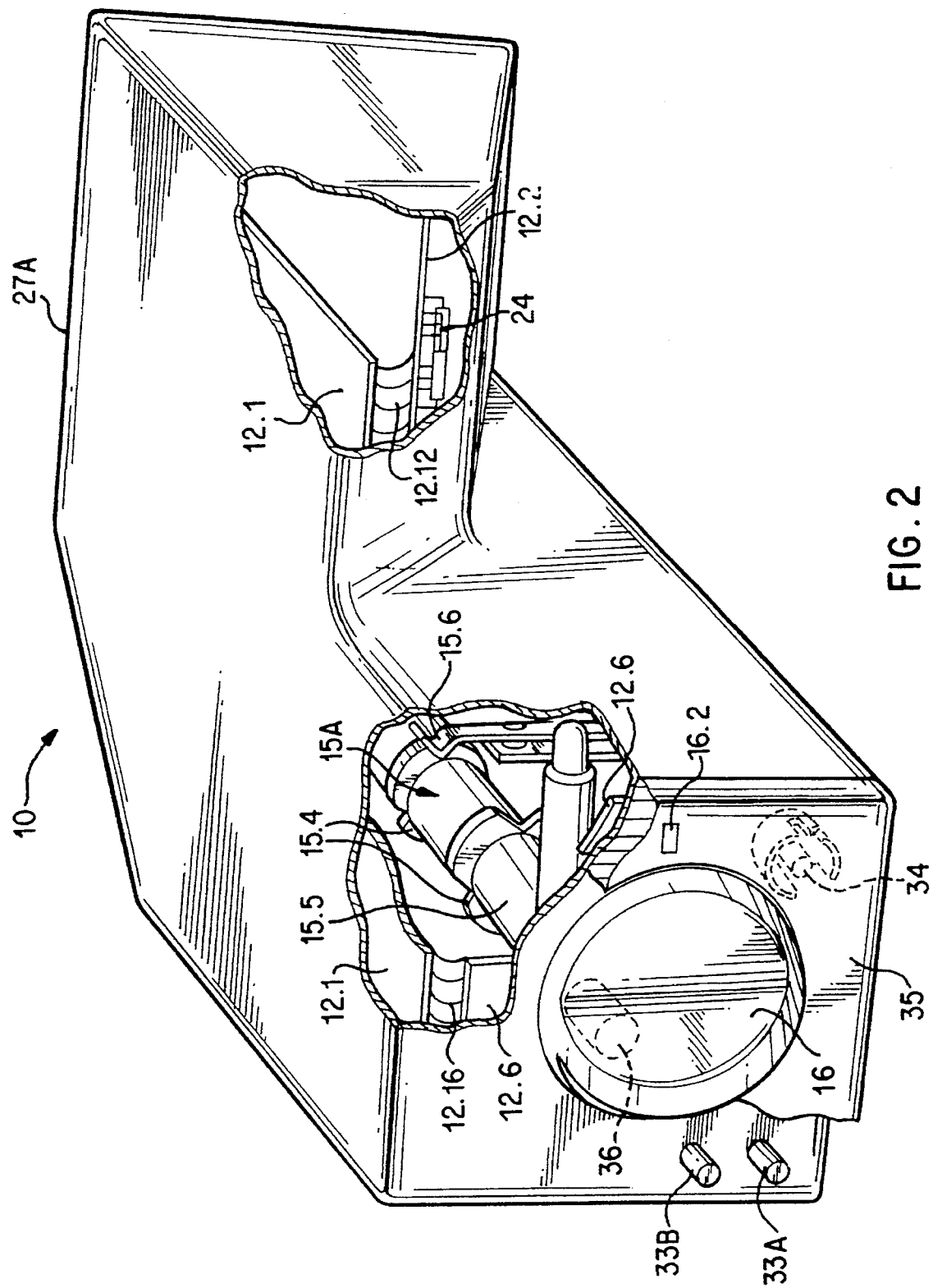
FIG. 2 shows a perspective view of a second exemplary embodiment of the light switching device seen approximately from the viewing angle of the driver, with various break-outs for illustration.
Figure 3:
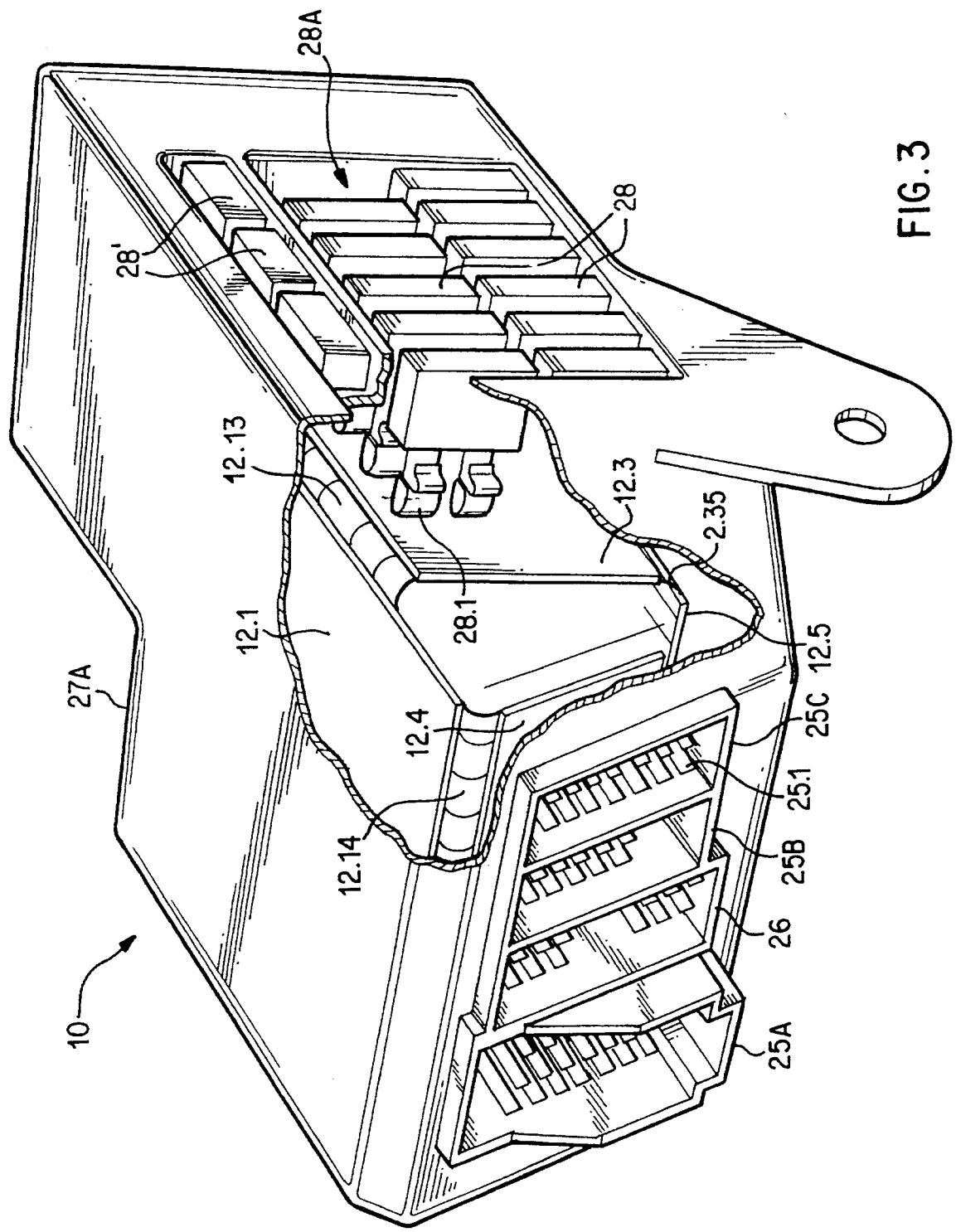
FIG. 3 shows a view rotated with respect to FIG. 2 with various break-outs for illustration.

According to FIGS. 2 and 3, another embodiment of the invention is illustrated which has a plurality of circuit boards 12.1 to 12.6 with welded-on flexible conductor foils 12.12 to 12.35, which establish the electrical connection between the individual circuit boards. This light switching device 10 quite specifically provides easy accessibility to a sizeable number of fuses 28 or reserve fuses 28' in such a way that with the light switching device 10 arranged at the driver's end of the dashboard the fuses are exposed in a patchboard in the lateral terminating surface of the dashboard after opening of the driver's door and removal of a correspondingly shaped cover (for example a component part of the lateral end panelling of the dash board, therefore not represented here in the figures). Consequently, the fuses are accessible in an unconfined manner when the driver's door is partially open. Between the plane of the patchboard 28A for the fuses and the virtually perpendicular front face of the light switching device 10 there is thus an angle here, which in practice can lie in the range 90° ±35°.

By way of example, in this embodiment a total of six circuit boards 12.1 to 12.6 are inserted. These include the upper circuit board 12.1 for carrying the lamp currents from the switching contacts via the fuses 28 to the plug-in connectors 25A to 25C, for receiving conductor tracks, which at the same time perform the function of current measuring shunts, and components which serve for current sensing, a circuit board 12.2 for receiving control, monitoring and alarm circuits, a circuit board 12.3 for receiving all the fuses 28, a circuit board 12.4 for receiving all the plug-in connectors, a circuit board 12.5 for connecting all the switching contacts of the switching component 15A, and a segmented circuit board 12.6 for mounting and supplying indicating, illuminating and warning lamps 33A, 33B and 34 on the operator's side.

The switching component 15A as such is designed, for example, similarly to the exemplary embodiment according to FIG. 1 as a multi-circuit switch with preferably a common drum 15.5, fitted with cams 15.4, and switching fingers 15.6 which cooperate with the cams 15.4 to effect the opening and closing of respectively desired contacts upon turning or axial displacement of at least part of the controller drum 15.5. Apart from being designed for rotary actuation, the switching component 15A may also be designed for further switching functions upon pulling and pushing in the knob 16.

Within the scope of the invention, a plurality of individual printed circuit boards may also be provided in the case of the exemplary embodiment according to FIG. 1, it then being possible for these to be arranged one folded above the other, for example in an S-shaped manner. In certain embodiments, each of the printed circuit boards is equipped with plug-in connectors 25 and/or 26, which are then able to perform carrying and fixing functions at the same time for the individual circuit boards by fitting into molded portions of the housing 27.

To keep the installation dimensions of the light switching device 10 as small as possible, so that it can be inserted into the dashboard in a modular manner the circuit board(s) 12 or 12.1 to 12.6 may also be multilayered and equipped with surface mounted devices, if appropriate, even on both sides.

Figure 4:
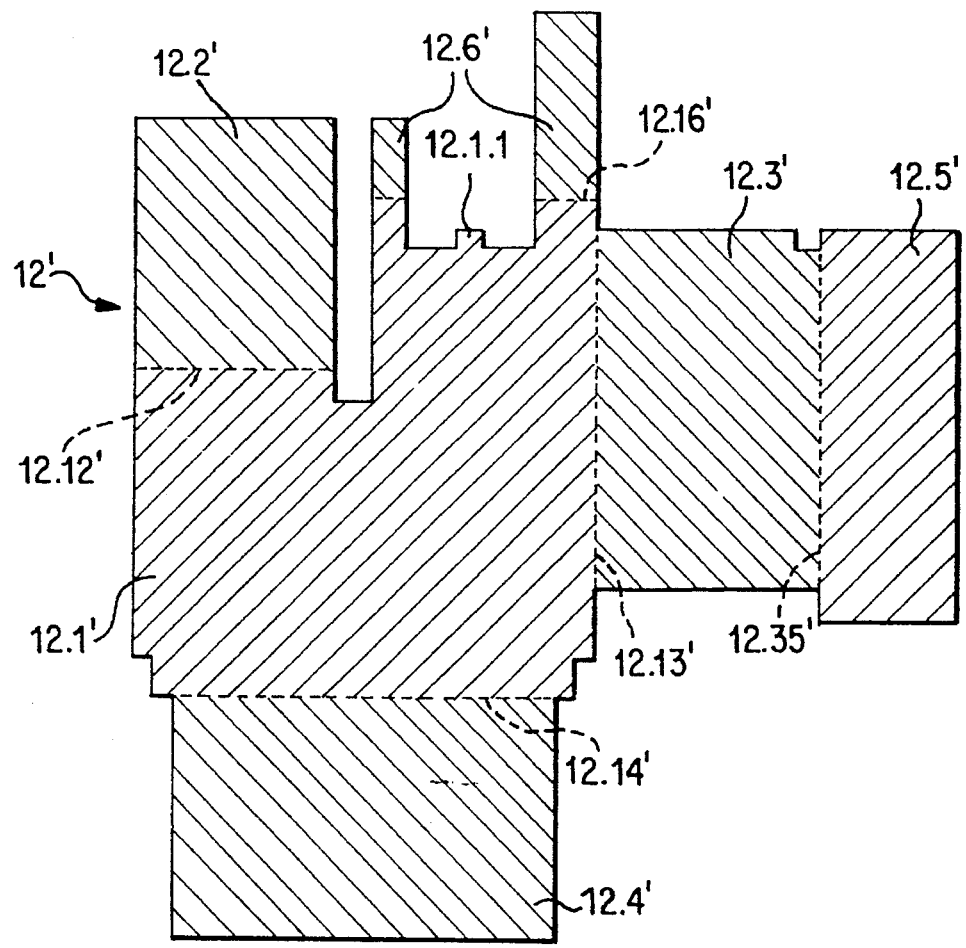
FIG. 4 shows the planar view of a one-piece flexible switching laminate of an exemplary outline, which permits its folding together around the one actual multifunction light switch in the case of the exemplary embodiment according to FIGS. 2 and 3.

In this case, within the scope of the invention, the circuit boards 12.1 to 12.6 need not be individual hard boards, connected by particularly flexible connectors 12.12 to 12.35, but according to FIG. 4 as component parts 12.1' to 12.6' of an integral conductor foil element 12', which is folded along folding lines 12.12' to 12.35' and in which all the electrical components of the device are then contacted.

The accommodating of such altogether flexibly wired electrics around a switching component 15A in a correspondingly shaped housing 27A is evident from FIGS. 2 and 3.

The segments 12.6' may in this case serve for the electrical contacting and supplying of indicating, indicating and warning lamps 33A and 33B, for instance for the fog and/or rear fog lights and/or a lamp failure, and also of a switch area lamp 34, which protrudes into a cover 35 which is designed as a light guiding body, encloses the knob 16 and in which light-exit openings 16.2 are arranged symbolically for illuminating marking of the positions of the knob 16.

The cover 35, which appears as a front face and is otherwise designed preferably with an opaque surface, may also extend over the indicating and warning lamps 33A and 33B and, if appropriate, may also be penetrated partially or completely by these lamps. The lug 12.1.1 on the flexible conductor foil part 12.1' which can be seen in FIG. 4 is provided, for example, additionally for supplying a searchlight source 36, which is indicated by dashed lines in FIG. 2, is arranged behind the knob 16 and illuminates the rear side of the knob 16 as a light entry face of a light guide integrated in the knob 16, preferably even when the operating illumination is switched off. A search symbol, not indicated in the figures but in particular on the actuating grip 16.1 of the knob 16, can then be supplied with light, permanently if required, from the lug.

The scope of the invention also comprises the feature that a flexible conductor foil element 12' according to FIG. 4 is used as wiring means for checking, controlling and warning functions, and metal punched parts, not represented here in the figures but in particular, for example, a metallic punched grid, are used as current carrying means for at least part of the lamp currents.

In this case, correspondingly punched conductor elements may then be formed on a first end as contact elements 28.1 (FIG. 3) for plug-in fuses and on a second end as plug-in connection contacts 25.1 (FIG. 3) of the plug in connectors (25A, 25B, 25C) formed onto the housing (27A).

Finally, within the scope of the invention, the housing 27A may be designed such that it can be clipped together at least partially from single parts, thereby making possible a simple and quick accommodation of the folded conductor foil element 12' (FIG. 4) in a housing and also a simple clipping or plug-in assembly of the switching component 15 entirely without loose parts.

Within the scope of such a structural design, in certain embodiments the entire housing is a one piece plastics injection molding which can be folded together before latching by film hinges formed on it and can then be latched in itself.

This light switching device 10 is a highly integrated complete unit which modularly integrates light switches, light-controlling functions, light circuit fuse protection, testing and warning functions up to and including communication with other devices in the vehicle, combined with easy accessibility of the fuses for the operating illumination of a motor vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Light switching device for a motor vehicle having a plurality of lamps which provide operating illumination, at least one exchangeable fuse, and at least one of a dashboard and an instrument panel, the light switching device comprising:

at least one switching component, capable of more than one switching position and coupled to the plurality of lamps, for switching on and off the plurality of lamps;

indicating means for indicating an operating state of the lamps which provide operating illumination;

an electrical plug-in connection integrated with the switching component and the indicating means, into a single piece that is insertable into the dashboard or the instrument panel of the motor vehicle;

an integrated semi-conductor circuit that monitors current flows to said lamps, to provide at least one of a checking and a warning function concerning operational status of the lamps which provide operating illumination;

a patchboard for the at least one fuse integrated into the light switching device in a location accessible from an interior of the vehicle, at a vertical level which is the same as a vertical level of the at least one switching component; and a housing which is closed on all sides, and contains at least one of a circuit board on which at least some of said integrated semiconductor circuit and said lamps are mounted, and a flexible conductor foil element, said at least one of a circuit board and a foil element having thereon at least one current path for conducting lamp current monitored by said integrated circuit.

2. Light switching device according to claim 1, wherein said at least one fuse is arranged at a location adjacent at least a position of the switching component corresponding to a respective circuit to be fuse-protected by said at least one fuse.

3. Light switching device according to claim 1, wherein the patchboard is a component part of a fuse holder, said fuse holder being fastened as an individual part on at least one circuit board.

4. Light switching device according to claim 1, further comprising a housing having a shaped portion, wherein the patchboard is on a fuse holder formed by the shaped portion of the housing, said shaped portion receiving at least one of fuse contact elements and fusing means, and is in one piece with the switching component.

5. Light switching device according to claim 1, wherein the switching component has an actuating handle and said device has a substantially perpendicular front face on or in which the actuating handle is arranged, said front face forming with the plane of the patchboard an angle in the range of 90°±35°.

6. Light switching device according to claim 5, wherein the device adapted to be installed at a driver's end of the dashboard, whereby the fusing means are accessible when a driver's door is partially open.

7. Light switching device according to claim 1, wherein said device contains a one-piece foldable conductor foil element having subregions arranged in various folding planes, said subregions having different assigned electrical functions.

8. Light switching device according to claim 1, further comprising a housing closed on all sides which contains a metal punched part, connected as a measuring current path for a lamp current.

9. Light switching device according to claim 8, wherein the metal punched part is an element for fastening the switching component or the fuse holder within the housing.

10. Light switching device according to claim 8, wherein the metal punched part has separate load-current terminals and measuring-voltage terminals.

11. Light switching device according to claim 1, further comprising a housing closed on all sides that contains a flexible conductor foil element as wiring means for checking, controlling and warning functions, and metal punched grid forming current-carrying means for at least part of the lamp currents.

12. Light switching device according to claim 1, further comprising punched conductor elements, one end of each conductor element being a contact element for a plug-in fuse and the other end of each conductor element being a contact element of a multiple plug-in connector part formed onto a housing of the light switching device closed on all sides.

13. Light switching device according to claim 1, further comprising at least one of a checking lamp and a warning lamp connected to at least one of the circuit board and the conductor foil element, for providing a checking or a warning function for the operating illumination of the vehicle.

14. Light switching device according to claim 13, further comprising light-conducting means by which light of a light source for checking, warning or switching position symbol illumination or of a searchlight source that is suppliable with current even when the illumination is switched off, is directable into the vehicle interior.

15. Light switching device according to claim 1, further comprising as a measuring shunt at least one exchangeable fusing means including its contact transfer resistors for providing a lamp-checking function.

16. Light switching device according to claim 1, further comprising means for application-specific adaptation of the light switching device that are additionally fitted within the housing on the circuit board or the conductor foil element on specified locations.

17. Light switching device according to claim 1, further comprising means for connecting said light switching device in communication with other electronic devices in the vehicle.

18. Light switching device according to claim 1, further comprising a housing which comprises a plurality of individual parts which are clipped together.

19. Light switching device according to claim 18, wherein the housing is a one-piece plastic injection molding which is foldable together before latching by film hinges formed on the molding.

20. Light switching device according to claim 1, wherein the patchboard has plug-in locations for replacement fusing means.

21. Light switching device according to claim 1, wherein, the device comprises the control part of a hazard warning lights system of the motor vehicle.

22. Light switching device according to claim 1, wherein the patchboard is a component part of a fuse holder, said fuse holder being at least partially formed by shaped portions of the housing of the light switching device substantially closed on all sides, said shaped portions receiving fuse contact elements.

* * * * *